United States Patent [19]

Takezono

[11] Patent Number: 4,597,353
[45] Date of Patent: Jul. 1, 1986

[54] AMPHIBIAN VEHICLE

[75] Inventor: Masatsugu Takezono, Tokyo, Japan

[73] Assignee: Teiemu Giken Kabushiki Kaisha, Tokyo, Japan

[21] Appl. No.: 657,015

[22] Filed: Oct. 2, 1984

[30] Foreign Application Priority Data

| Nov. 28, 1983 | [JP] | Japan | 58-183364[U] |
| Dec. 7, 1983 | [JP] | Japan | 58-188160[U] |
| Dec. 9, 1983 | [JP] | Japan | 58-190232[U] |
| Feb. 17, 1984 | [JP] | Japan | 59-21432[U] |
| May 16, 1984 | [JP] | Japan | 59-70435[U] |
| May 23, 1984 | [JP] | Japan | 59-75614[U] |
| May 23, 1984 | [JP] | Japan | 59-103804 |

[51] Int. Cl.$^4$ .......................... B63B 35/86
[52] U.S. Cl. ........................ 114/270; 301/1; 440/91
[58] Field of Search .......... 114/270; 440/26, 27, 440/99, 100, 97, 91, 92, 93; 301/1, 125, 121, 111; 416/86

[56] References Cited

U.S. PATENT DOCUMENTS

| 92,807 | 7/1869 | Farmer | 440/27 |
| 392,866 | 11/1888 | Kenyon | 301/126 |
| 1,810,154 | 6/1931 | Alig | 114/270 |
| 2,275,302 | 3/1942 | Magnuson | 301/125 |
| 3,397,669 | 8/1968 | Katehis | 114/270 |
| 3,704,916 | 12/1972 | Dietrich | 301/1 |

FOREIGN PATENT DOCUMENTS

| 3094 | of 1881 | United Kingdom | 440/100 |
| 755620 | 8/1980 | U.S.S.R. | 301/1 |

Primary Examiner—Galen L. Barefoot
Assistant Examiner—Thomas J. Brahan
Attorney, Agent, or Firm—Wenderoth, Lind & Ponack

[57] ABSTRACT

An amphibian vehicle which can travel both on land and on the water is disclosed wherein a front wheel which can be controlled in direction by operation of a handle, is provided at a front portion of a body having float members therearound while a drive shaft adapted to be rotated by driving means is disposed at a rear portion of the body and in a direction perpendicular to a direction of movement of the body, and that a wheel is supported for rotation on the drive shaft such that, during running on land of the amphibian vehicle, it may be directed perpendicularly to the drive shaft, and during running on the water, it may be directed obliquely to the drive shaft. Thus, during running of the amphibian vehicle on land, the wheel is directed perpendicularly to the drive shaft so that it may act as a driving rear wheel, and during running on the water, the body is allowed to float on the water by the float members while the wheel is directed obliquely to the drive shaft so as to produce a propelling force for running on the water.

9 Claims, 21 Drawing Figures

AMPHIBIAN VEHICLE

BACKGROUND OF THE INVENTION

This invention relates to an amphibian vehicle such as a bicycle, motorcycle or the like which can travel both on land and on the water.

Conventionally, a vehicle such as, for example, a bicycle or a motorcycle is normally designed to travel on land while a small boat which is propelled by man power or by an engine is used only on the water. Thus, there has been no simple vehicle present so far which can travel both on land and on the water in similar readiness to that of such conventional vehicles.

Accordingly, realization of a simple vehicles such as a bicycle or a motorcycle which can readily travel both on land and on the water around a lake or on a recreation ground or the like has been desired.

SUMMARY OF THE INVENTION

It is an object of the present invention to provide an amphibian vehicle which can travel on land in a similar manner to that of a conventional vehicle and can travel readily also on the water.

It is another object of the invention to provide an amphibian vehicle which has a propelling device of a simplified construction which can provide an efficient propelling force during running of the vehicle on water.

In order to attain these objects, an amphibian vehicle according to the present invention is characterized in that a front wheel which can be controlled in direction by operation of a handle is provided at a front portion of a body having float members therearound while a drive shaft adapted to be rotated by driving means is disposed at a rear portion of the body and in a direction perpendicular to a direction of advancement of the body, and that a wheel is supported for rotation on the drive shaft such that, during running on land of the amphibian vehicle, it may be directed perpendicularly to the drive shaft, and during running on the water, it may be directed obliquely to the drive shaft.

DETAILED DESCRIPTION OF THE INVENTION

Figure 1:
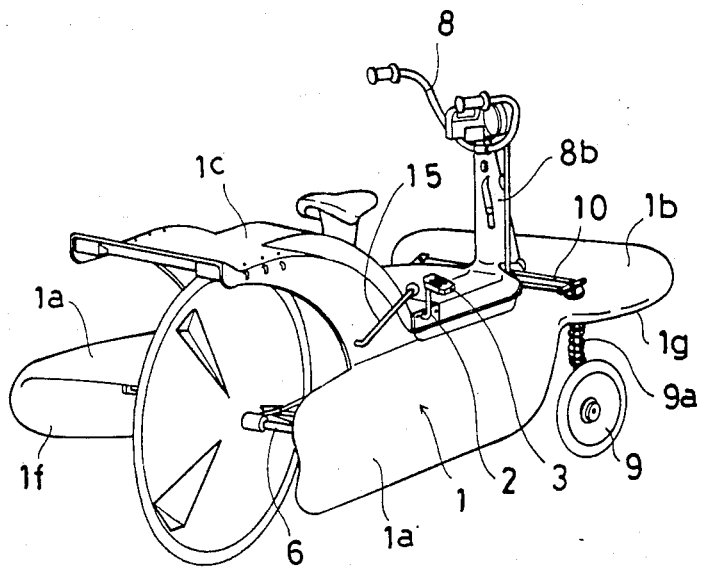
FIG. 1 is a perspective view of an embodiment of the present invention which is applied to an amphibian bicycle, as viewed obliquely from behind.
Figure 2:
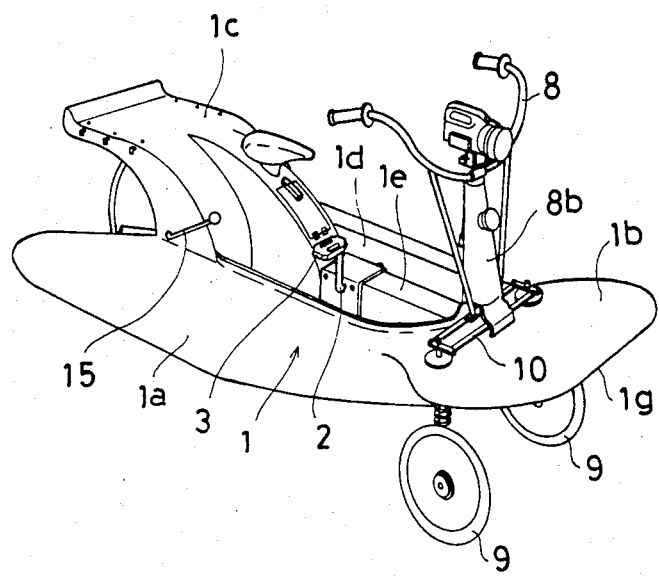
FIG. 2 is a perspective view of the amphibian bicycle, as viewed obliquely from front.
Figure 3:
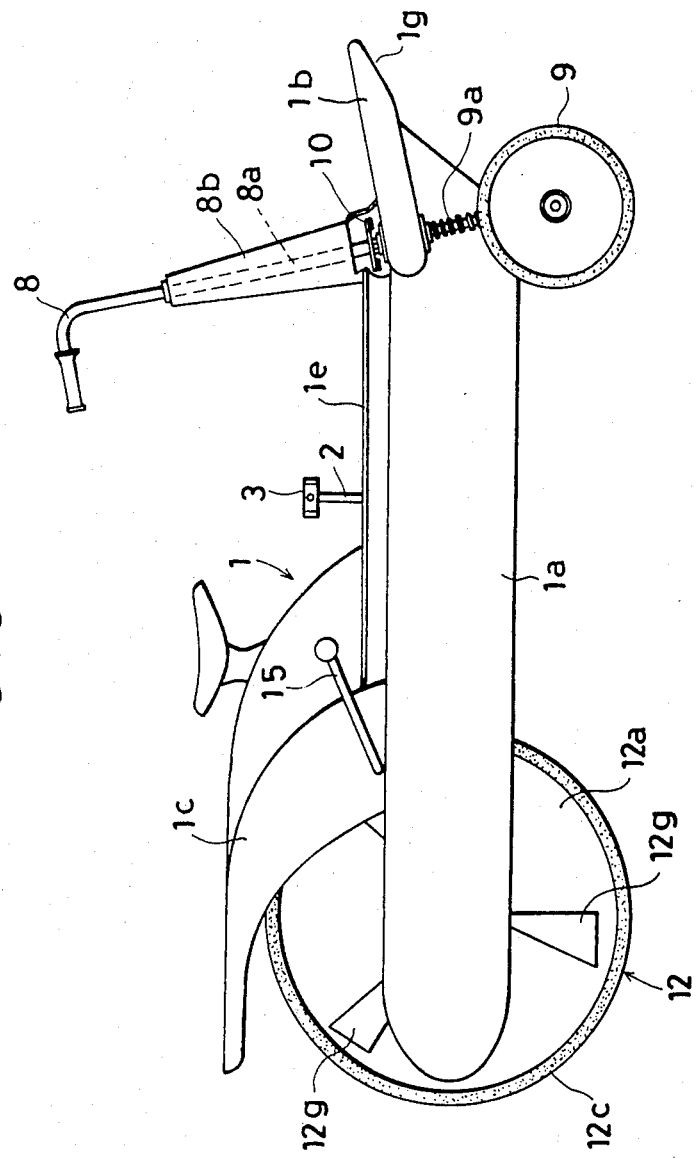
FIG. 3 is a partially broken plan view of the amphibian bicycle.
Figure 4:
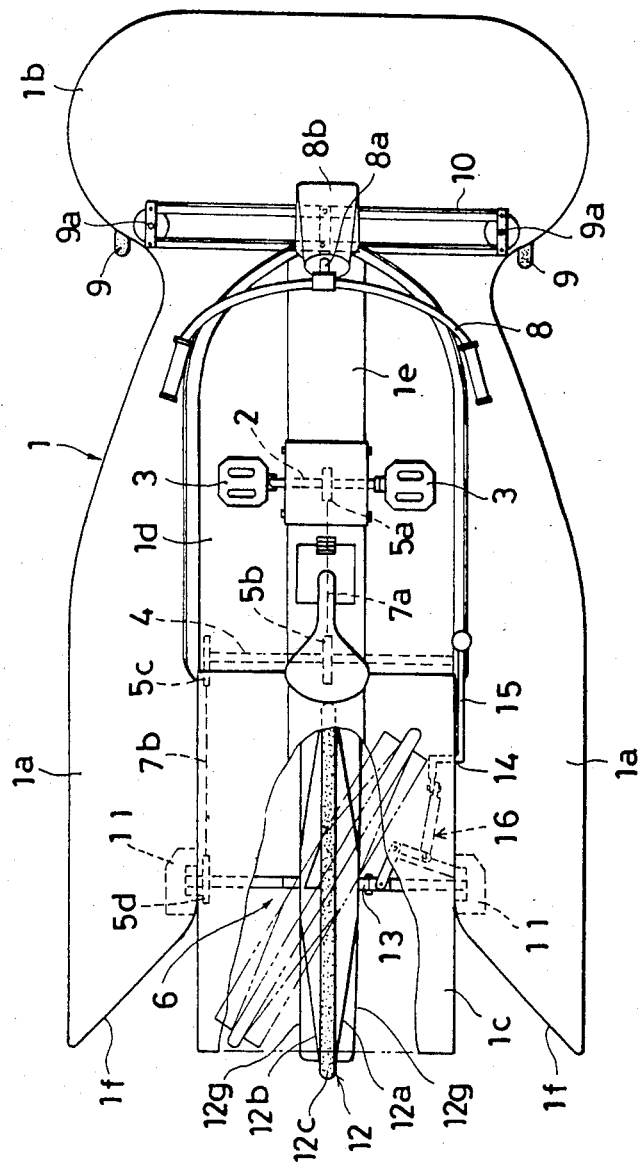
FIG. 4 is a front elevational view of the amphibian bicycle.

The present invention will be described in connection with an embodiment in which the invention is applied to an amphibian bicycle with reference to FIGS. 1 to 19 of the accompanying drawings.

The amphibian bicycle has a body 1 including a pair of left and right float members 1a, another float member 1b in the form of a rectangular flat plate which interconnects front portions of the float members 1a to each other, a fender 1c which interconnects rear portions of the float members 1a to each other, and a tub member 1d surrounded by those elements 1a, 1b and 1c and having a web 1e at the center thereof. Those body elements are made of a material such as engineering plastics. At a front portion of a bottom face of the float member 1b in the form of a flat plate, an abutting face 1g adapted to abut against the water when the amphibian bicycle advances onto the water from an inclined face of land is formed in inclined relationship to the horizontal of the body 1.

The abutting face 1g abuts, when the amphibian bicycle runs on an inclined face of land and then advances onto the water, against the water to instantaneously produce high resistance therebetween thereby to prevent the body 1 advancing into the water, and then it prevents a front portion of the body 1 from going into the water due to buoyancy caused thereby so that it provides smooth transition from running on land to running on the water.

Preferably, the abutting face 1g is formed around the water line of the body 1, and it is most preferable to form it at a location a little higher than the water line. If the abutting face 1g is located otherwise too low below the water line, then it will cause resistance during normal running on the water, resulting in difficulty in forward movement of the amphibian bicycle. On the contrary, if it is located too high, when the amphibian bicycle advances onto the water from land, a front portion of the body 1 will go into the water before the abutting face 1g reaches the water.

The amphibian bicycle further has a crankshaft 2 mounted for rotation on the central web 1e and which has a pair of pedals 3 at opposite ends thereof, a transmission shaft 4 mounted for rotation on and extending between mid portions of inner side faces of the float members 1a, a sprocket wheel 5a secured to the crankshaft 2, further sprocket wheels 5b and 5c secured to the transmission shaft 4, a further sprocket wheel 5d secured to a drive shaft 6 which is in turn mounted for rotation on and extends between rear end portions of the inner faces of the float members 1a, a chain 7a extending between the sprocket wheels 5a and 5b, and another chain 7b extending between the sprocket wheels 5c and 5d. Thus, if the pedals 3 are treaded to rotate the crank-shaft 2, then the drive shaft 6 is rotated through the sprocket wheels 5a to 5d, the chains 7a and 7b, and the transmission shaft 4.

Figure 5:
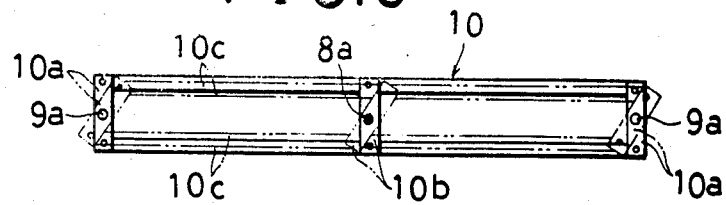
FIG. 5 is a plan view of a link mechanism of a steering device of the amphibian bicycle.

The amphibian bicycle further includes a handle 8, a handle shaft 8a mounted for rotation on a bearing member 8b which is provided at a front end portion of the central body web, a pair of front wheel shafts 9a mounted for rotation at opposite side portions of the float member 1b, a front wheel 9 mounted for rotation at a lower end of each of the front wheel shafts 9a, and a link 10 connecting the handle shaft 8a to the front wheel shafts 9a. The link 10 includes, as shown in FIG. 5, a pair of arms 10a secured at mid portions thereof to the front wheel shafts 9a, another arm 10b secured at a mid portion thereof to the handle shaft 8a, and a pair of parallel rods 10c connected for pivotal motion to opposite ends of the arms 10a and 10b by means of pins. Thus, pivotal motion of the handle 8 will bring the parallel rods 10c, through the handle shaft 8a and the arm 10b, into a deformed parallel position, for example, as shown in phantom in FIG. 5, to thus pivot, through the arms 10a and the front wheel shafts 9a, the front wheels 9 each in the form of a disk with a tire thereby to attain intended steering on land and on the water.

Figure 6:
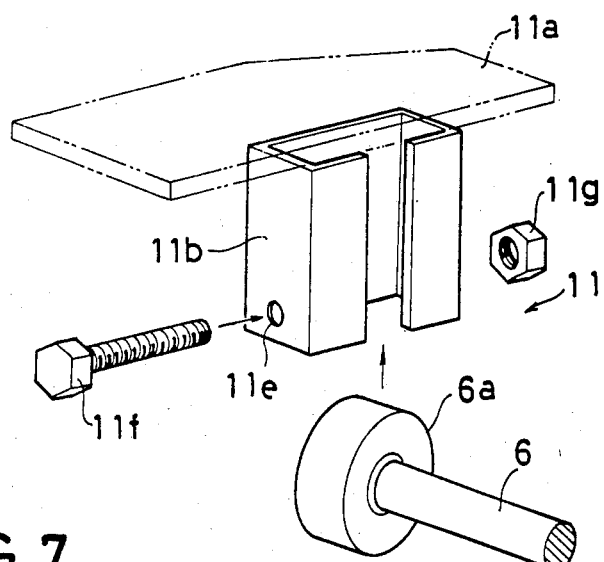
FIG. 6 is a fragmentary perspective view of a support device for a bearing of a drive shaft of the amphibian bicycle.

The amphibian bicycle further has a pair of bearing supporting devices 11 for securely supporting a pair of bearings 6a at opposite ends of the drive shaft 6. Each of the bearing supporting devices 11 includes, as shown in FIG. 6, a bracket 11b having a substantially angular C-shaped or channel-like cross section and welded at the top end thereof to a bottom face of a mounting plate 11a fixedly mounted on a bottom face of a rear portion of each of the float members 1a, and holding means removably mounted at a lower end of the bracket 11b. The holding means includes a holding member 11c in the form of a box, a bolt 11f extending through a center hole 11d in the holding member 11c and a pair of holes 11e formed at lower end portions of opposite side walls of the bracket 11b, and a nut 11g cooperating with the bolt 11f to secure the holding member 11c in position.

In removing the bearing 6a, the bolt 11f and the nut 11g are first removed and then the holding member 11c is removed downwardly from the bracket 11b, thereby allowing the drive shaft 6 to be removed downwardly together with the bearing 6a from the bracket 11b. It is to be noted that, because the drive shaft 6 is located below the fender 1c and between the left and right side float members 1a, it cannot be removed easily toward such elements, and besides the drive shaft 6a is restricted from movement in a rearward direction by the chain 7b. Actually, however, removal of the drive shaft 6 is not hindered by any element since the bearing supporting devices 11 are designed to be removed downwardly.

Meanwhile, in mounting the bearing 6a, the steps are followed reversely, and thus the bearing 6a at an end portion of the drive shaft 6 is inserted from below into the bracket 11b, and then the holding member 11c is inserted similarly into the bracket 11b whereafter the holding member 11c is secured to the bracket 11b using the bolt 11f and the nut 11g. In this way, the bearing 6a can be assembled easily to the bracket 11b. It is to be noted that while the holding member 11c is secured to the bracket 11b by means of a bolt 11f and a nut 11g, securing means is not limited to this and may be any means which prevents the bearing 6a from being removed from the bracket 11b and can be removably mounted on the bracket 11b.

According to the bearing device 11, disassembly and maintenance such as removal of an axle such as the drive shaft 6, replacement of a bearing, and so on, can be effected very easily, and the bracket can be formed from conventional material by cutting lipped channel steel or the like having an angular C-shaped cross section. Consequently, the bearing device 11 is simple in construction and thus can be obtained at a reduced cost.

Figure 7:
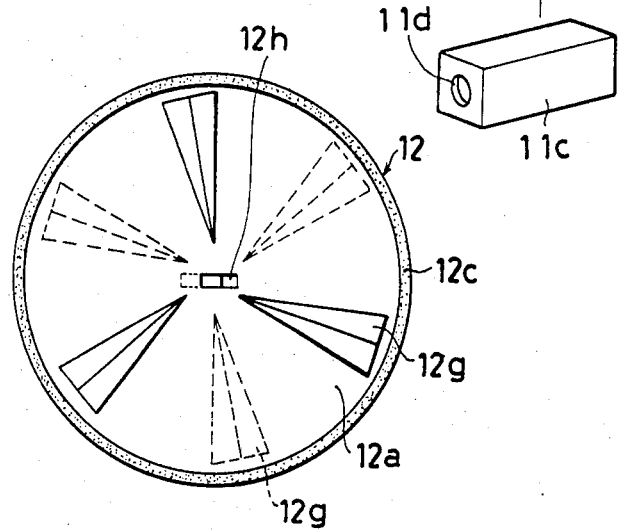
FIG. 7 is a front elevational view of a wheel.
Figure 8:
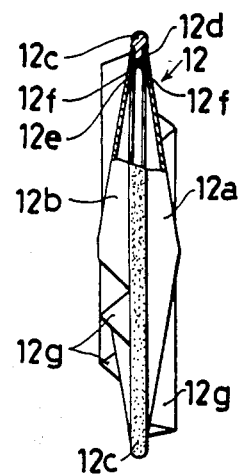
FIG. 8 is a side elevational view of the wheel, partly in section.

The amphibian bicycle further includes a wheel 12 which acts as a rear wheel during running on land and also as a propelling element during running on the water. The wheel 12 includes a pair of disks 12a and 12b on opposite sides and a tire 12c interposed between and secured to circumferential edges of the disks 12a and 12b, as shown in FIGS. 7 and 8.

Figure 9:
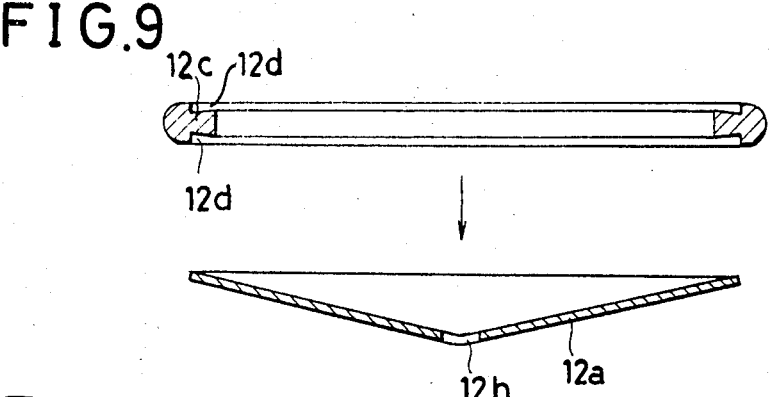
FIGS. 9 to 12 are cross sectional views illustrating steps of production of a wheel.

Production of the wheel 12 will be described below. A tire 12c made of a rubber material and having a pair of recessed grooves 12d on opposite sides of an inner periphery and a pair of disks 12a and 12b made of an engineering plastics material such as glass fiber reinforced plastics (GFRP) which, for example, is obtained by impregnating glass fiber with a thermosetting resin such as unsaturated polyester resin to harden the same are prepared, and at first the recessed groove 12d on one side of the tire 12c is fitted around the circumference of one 12a of the pair of disks 12a and 12b, as shown in FIG. 9.

Figure 10:
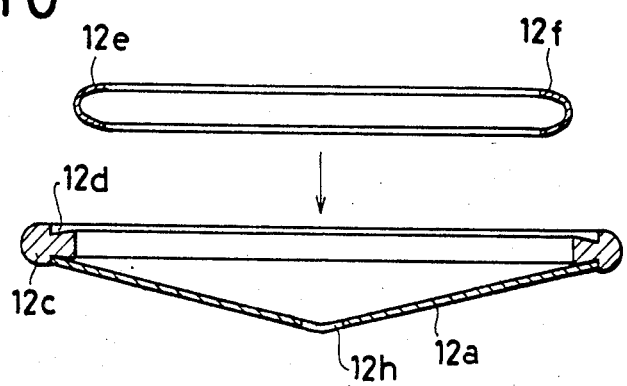

Subsequently, as shown in FIG. 10, a member is prepared which includes an annular elastic element 12e either having a semicircular cross section or made of a vinyl hose and a GFRP of unsaturated polyester resin families, that is, binder 12f of a synthetic resin adhered to an outer face of the elastic element 12e while it is in a fluidized condition before hardening. The member is fitted into the tire 12c in such a way that it contacts with an inner face of the disk 12a and also with an inner face of the tire 12c.

Figure 11:
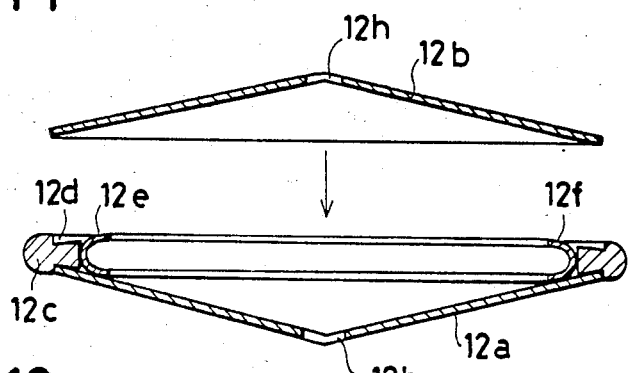
Figure 12:
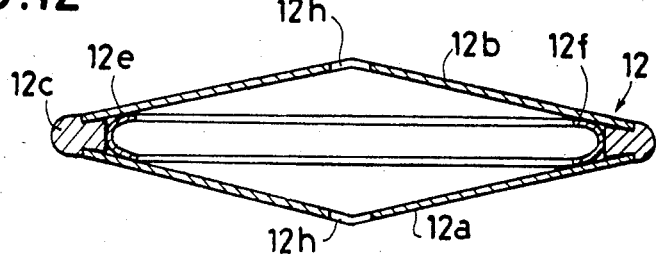

Then, as shown in FIG. 11, another disk 12b is fitted at a circumferential edge thereof with the recessed groove 12d on the opposite side of the tire 12c while it presses at an inner face thereof against the elastic element 12e in order to attain the condition as shown in FIG. 12. Thereafter, the disk 12b is held under pressure in the fitted condition for a period of about two hours. During this period, the elastic element 12e presses at opposite outer faces thereof against inner faces of the pair of disks 12a and 12b due to elasticity of the elastic element 12e while the binder 12f on the outer faces of the elastic element 12e is adhered assuredly and firmly to the inner faces of the disks 12a and 12b as it becomes hardened. As a result, the disks 12a and 12b are firmly secured and connected to the thus hardened elastic element 12e. The wheel 12 thus produced does not become rusty by contact with sea water or the like during running on the water while it is used as an amphibian vehicle, and hence the wheel 12 can be used for a long time without deformation and is firm and durable.

Figure 13:
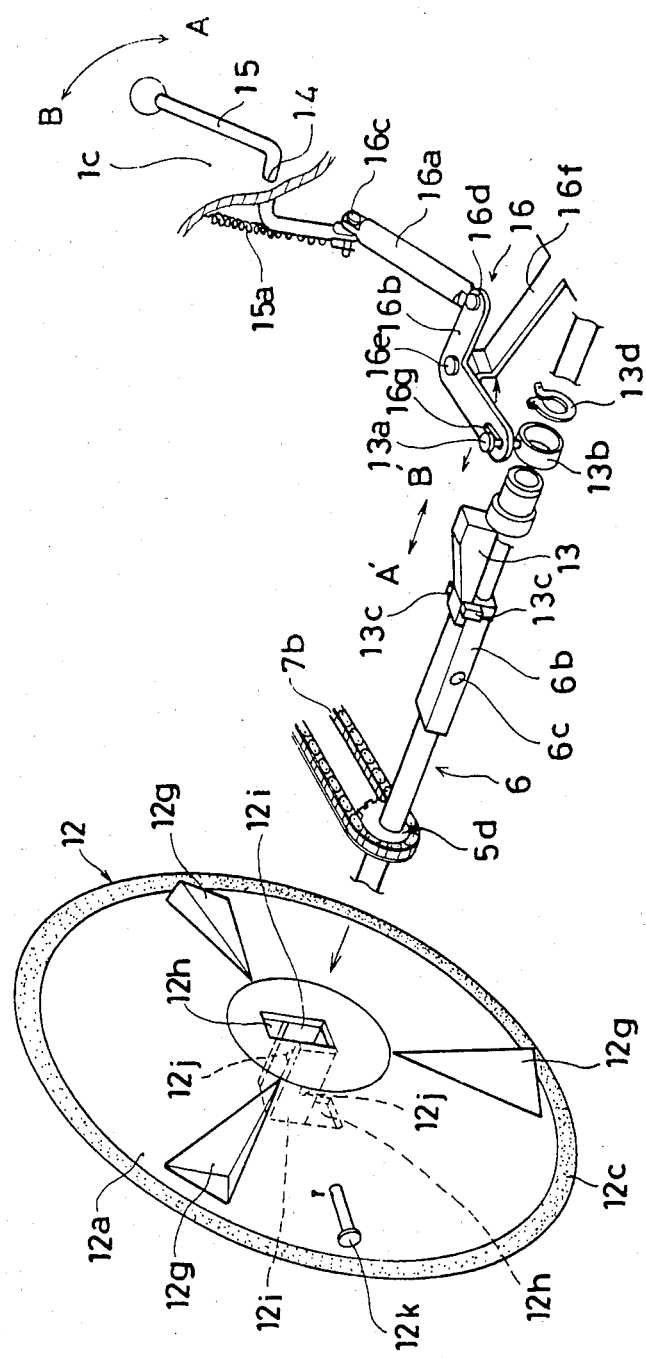
FIG. 13 is a fragmentary perspective view of a device changing over the wheel between a position perpendicular and another position oblique to the drive shaft.

Each of the disks 12a and 12b of the wheel 12 has a rectangular elongated hole 12h formed at a central portion thereof, and the elongated holes 12h are displaced by an angle of 180 degrees in phase from each other. As shown in FIG. 13, a pair of parallel flat plates 12i are fixed extendedly between the elongated holes 12h and in a spaced relationship by a distance equal to the width of the elongated holes 12h. Each of the parallel flat plates 12i has a hole 12j perforated at the center thereof.

The drive shaft 6 has, at an intermediate part thereof, a square shaft portion 6b which has a cross section of a square having a dimension rather smaller than the width of the elongated holes 12h of the wheel 12. The square shaft portion 6b has a hole 6c perforated at the center thereof. Thus, the square shaft portion 6b is inserted into the elongated holes 12h of the wheel 12 and a pin 12k is inserted into the holes 12j and 6c thereby to connect the wheel 12 to the square shaft portion 6b so that it may move from a perpendicular to an oblique position with respect to the shaft.

A guide member 13 in the form of a wedge is mounted for back and forth movement on the square shaft portion 6b, and a ring 13b having a pin 13a provided projectingly thereon is fitted for rotation on a cylindrical portion at a rear end of the guide member 13 such that back and forth movement of the pin 13a along the drive shaft 6 will move the guide member 13 into and out of the elongated holes 12h. The guide member 13 has a pair of guides 13c preventing lateral movement of the guide member 13 during back and forth movement, and a ring 13d for preventing the ring 13b from being removed from the guide member 13.

Figure 14:
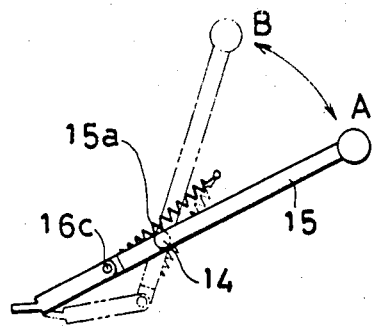
FIG. 14 is an illustrative view showing an operation of an operating lever of the device of FIG. 13.
Figure 15:
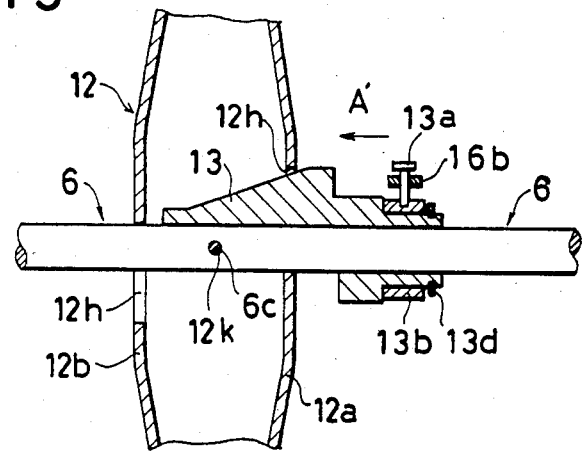
FIG. 15 is a cross sectional view showing the wheel connected perpendicularly to the drive shaft.

The amphibian bicycle further includes an operating lever 15 mounted for rocking motion about a bearing 14 formed on a side face of the fender 1c. Thus, the operating lever 15 is connected to the pin 13a on the ring 13b via a link mechanism 16 so that rocking operation of the operating lever 15 will move the pin 13a back and forth along the drive shaft 6 to thus move the guide member 13 into and out of the elongated hole 12h. The link mechanism 16 includes a link 16a in the form of a bar and another L-shaped link 16b, a pin 16c rotatably connecting an end of the operating lever 15 to an end of the bar-formed link 16a, another pin 16d rotatably connecting the other end of the bar-formed link 16a to an end of the L-shaped link 16b, a further pin 16e rockably supporting a mid portion of the L-shaped link 16b, and a securing stay 16f having the pin 16e secured at an end thereof and having a base end thereof securely fixed to an inner face of the side float member 1a. The link 16b has an elongated hole 16g formed at the other end thereof for receiving the pin 13a to connect the link 16b to the pin 13a. A coil spring 15a extends between the fender 1c and the pin 16c and acts to position the operating lever 15a in a stabilized condition to either of limit positions (A or B) to which the operating lever 15 can be operated, as shown in FIG. 14.

Figure 17:
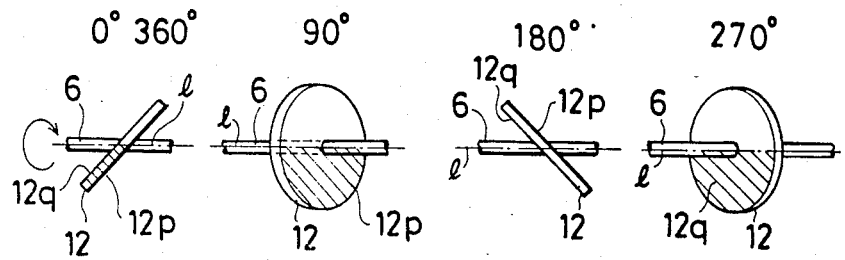
FIGS. 17 and 18 are a rear elevational view and a plan view, respectively, illustrating the wheel which operates to propel the amphibian bicycle on the water.
Figure 18:
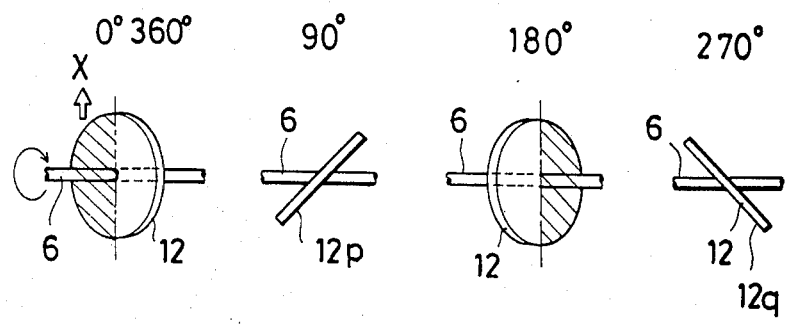

Now, a principle of operation of the propelling device of the amphibian bicycle on the water will be described with reference to FIGS. 17 and 18. In FIGS. 17 and 18, the wheel 12 is shown connected to the drive shaft 6 such that a plane thereof intersects obliquely with an axis of the drive shaft 6 while the drive shaft 6 is arranged substantially at a same level with the water level (1) and perpendicularly to a propelling direction (a direction of an arrow mark x in FIG. 18) of the amphibian bicycle.

Configurations of the wheel 12 as viewed from behind and in plan at rotational positions of 0, 90, 180 and 270 degrees where the 0 degree position is defined as a rightward inclined position at which the wheel 12 as viewed from behind of the propelling direction is inclined upwardly to the right are illustrated in FIGS. 17 and 18, respectively (a portion sunk under water is shadowed). Within a range of rotation from 0 to 180 degrees, a right-hand side face 12p of the wheel 12 pushes the water rearwardly to produce a propelling force, and the propelling force presents its maximum at the 90 degree position at which an area of the right-hand side face 12p projected rearwardly becomes maximum. At the 180 degree position, the wheel 12 assumes a leftward inclined position in which it is inclined upwardly to the left. Meanwhile, within a range of rotation from 180 to 360 degrees, the water is pushed rearwardly by a left-hand side face 12q of the wheel 12, and at the 270 degree position, the propelling force presents its maximum again. Such a cycle of operation is repeated, and a propelling force can be produced continuously by alternate paddling actions of the right- and left-hand side faces 12p and 12q of the wheel 12. If the drive shaft 6 is rotated in the reverse direction, a propelling force in the opposite direction can be obtained.

When it is intended to travel on land using the amphibian bicycle of the present embodiment, the operating lever 15 is pushed down in a direction of the arrow mark A in FIG. 13. This operation moves, via the link mechanism 16 and the ring 13b, the guide member 13 in a direction A' into the elongated hole 12h of the wheel 12 thereby to bring the wheel 12 to a position perpendicular to the drive shaft 6 as shown in full lines in FIGS. 15 and 4. Thus, if the pedals 3 are treaded to rotate the crank-shaft 2 as described hereinabove, the drive shaft 6 is rotated thereby. Rotation of the drive shaft 6 rotates the wheel 12 via the square shaft portion 6b and the parallel flat plates 12i, thereby allowing travelling of the amphibian bicycle on land.

Figure 16:
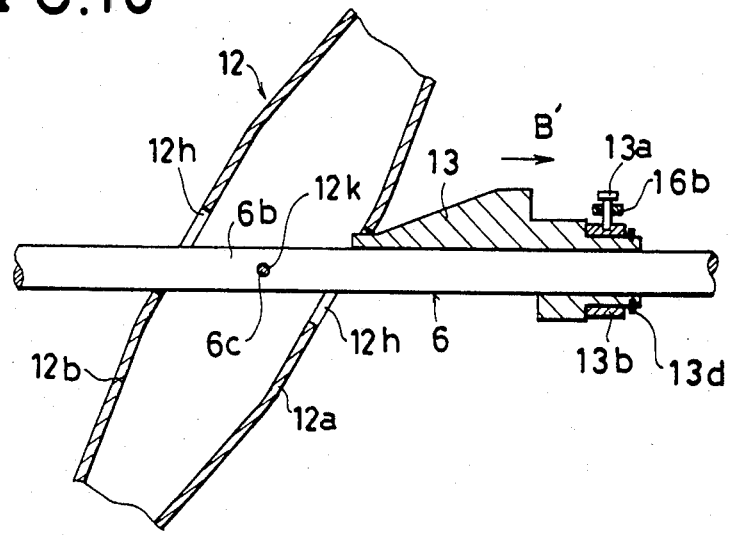
FIG. 16 is a similar cross sectional view of the wheel connected obliquely to the drive shaft.

On the other hand, when it is intended to travel on the water, the operating lever 15 is pulled up in the direction of the arrow mark B in FIG. 13 to move the guide member 13 in a direction B' out of the elongated hole 12h to bring the wheel 12 into a position in which it can be rocked about the pin 12k relative to the drive shaft 6. In this condition, the pedals 3 are treaded to rotate the drive shaft 6 as described hereinabove, the wheel 12 is rotated via the square shaft portion 6b of the drive shaft 6 and the parallel flat plates 12i. During this rotation, the wheel 12 assumes a position oblique to the drive shaft 6 as shown in FIG. 16 and also in phantom in FIG. 4 due to a pressure of the water applied thereto. Accordingly, as the drive shaft 6 rotates, a propelling force is continuously produced by alternate water paddling actions of both faces of the wheel 12 in every half rotation as described hereinabove, thus attaining efficient travelling on the water.

Further, according to the present amphibian bicycle, since changing over of the wheel 12 between the perpendicular position and the oblique position is effected by back and forth movement of the guide member 13 in the form of a wedge into and out of the elongated hole 12, such an operation is effected assuredly, and since the changing over operation is associated with operation of the operating lever 15, it can be performed very easily.

Now, description will be given of three improvements which are made to the amphibian bicycle of the present embodiment in order to further improve a propelling efficiency of the propelling device during travelling on the water.

The first improvement is in that each of the disks 12a and 12b of the wheel 12 is formed to have a tapered face which gradually projects outwardly toward the center thereof. If the wheel 12 is otherwise formed into a flat plate having a same thickness over the entire area thereof, then upon rotation from 0 to 90 degrees as in FIGS. 17 and 18 in which the wheel 12 produces a propelling force, the left-hand side face 12q of the wheel 12 moves up water therearound while upon rotation from 180 to 270 degrees, the right-hand side face 12p of the wheel 12 moves up water therearound. The water thus moved up acts as resistance to a propelling force, resulting in reduction of the propelling force of the amphibian bicycle.

On the contrary, formation of the disks 12a and 12b of the wheel 12 to have a tapered face reduces such resistance to a propelling force of the amphibian bicycle, resulting in increase of the propelling force.

Figures 19A, 19B, 19C:
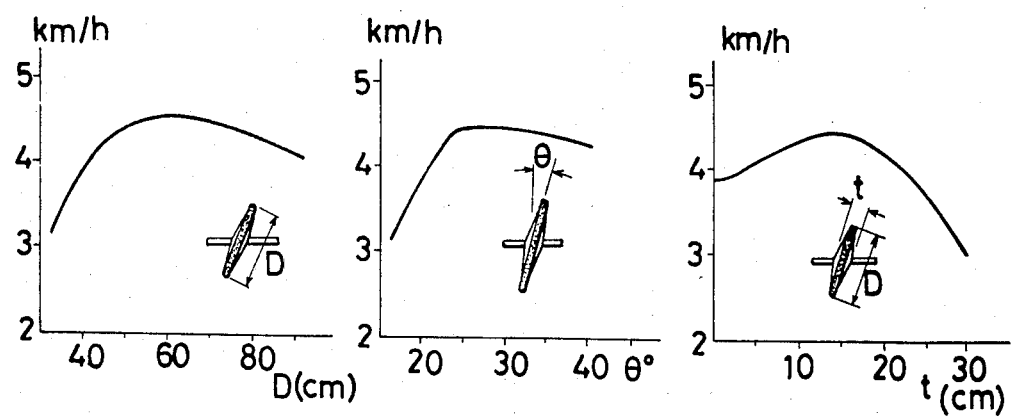
FIG. 19 is a diagram of results of examinations illustrating propelling speeds corresponding to variations of the size and dimension of the wheel.

Examinations have been conducted by the inventor in which an amphibian bicycle having a size of 2 m long, 1 m wide and 1 m high and a weight of 45 Kg is put on the water and is run by a person having a weight of about 75 Kg. Thus, results as illustrated in FIG. 19(a) were obtained when the wheels 12 of various diameters D were used. When the diameter D is 50 to 70 cm, the maximum speed of about 4.5 Km/h was attained. However, when the diameter D is greater than 70 cm, resistance of the wheel 12 itself becomes significantly great.

Subsequently, when the angular position $\theta$ of the wheel 12 relative to the drive shaft 6 was changed to various positions from the position in which it is perpendicularly to the drive shaft 6, results as illustrated in FIG. 19(b) were obtained. When the angle $\theta$ is 25 to 30 degrees, the highest speed of about 4.5 Km/h was obtained, and when the angle $\theta$ is greater than 30 degrees, resistance by the wheel 12 itself becomes significantly high.

Further, when the thickness t of a central portion of the wheel 12 having a diameter D of 67.5 cm is changed to various values, results as illustrated in FIG. 19(c) were obtained. When the thickness t is 12 to 15 cm, the highest speed of about 4.5 Km/h was obtained, and when the thickness t is lower than 12 cm, resistance by the wheel 12 itself becomes significantly high.

From such results as described above, it was found that the most preferable design of the wheel 12 is such that the diameter D is 50 to 70 cm, the inclination angle $\theta$ from the perpendicular position relative to the drive shaft 6 is 25 to 30 degrees, and the thickness t of the center is 12 to 15 cm.

The second improvement is in that three propelling blades 12g are located in an equiangularly spaced relationship by an angle of 120 degrees from each other on each of the disks 12a and 12b with the blades 12g on the disks 12a and 12b being displaced by an angle of 180 degrees from each other and are each formed to have a triangular cross section which gradually increases from the base to the opposite end of the blade 12g, that is, in a projecting manner while the propelling blades 12g extend from the base ends at the centers of the disks 12a and 12b to the other ends at circumferential portions of the disks 12a and 12b.

In particular, since an odd number of propelling blades 12g are located in an equiangularly spaced relationship from each other on each of the disks 12a and 12b with the blades 12g being displaced by an angle of 180 degrees, when the wheel 12 rotates to move the propelling blades 12g into and out of the water, a plurality of the propelling blades 12g on the individual faces of the wheel 12 do not move into or out of the water at a time, and hence an influence which is had on the wheel 12 by a change in resistance caused on the surface of the water is dispersed to thus reduce occurrence of irregular rotation to assure smooth rotation. Further, since each of the propelling blades 12g is formed to gradually project from an end thereof adjacent the center of the wheel 12 at which it does not contribute so much to a propelling force toward the other end thereof adjacent the circumferential edge of the wheel 12 at which it contributes utmost to a propelling force, a propelling force can be obtained efficiently.

The third improvement is in that inner faces of rear end portions of the float members 1a on both sides are formed as tapered faces 1f which gradually expand outwardly toward the rear ends thereof.

Since, during running on the water, the wheel 12 pushes the water away in a perpendicular direction to a plane thereof, water flows are produced alternately in rearward leftward and rightward directions relative to the body 1. In the present embodiment, since such water flows flow rearwardly along the tapered faces 1f formed on the inner faces at the rear end portions of the left and right float members 1a, they do not collide with the float members 1a and hence they do not cause a loss to the propelling force produced. Accordingly, an efficient propelling force is obtained, allowing stabilized running of the amphibian bicycle on the water.

It is to be noted that, while description has been given of the embodiment wherein the present invention is applied to an amphibian bicycle which is driven by man power, the present invention is not limited to this and power may be obtained from an engine such as a gasoline engine or an electric motor and so on.

What is claimed is:

1. An amphibian vehicle comprising:
   a front wheel, which can be controlled in direction by operation of a handle, provided at a front portion of a body having float members therearound;
   a drive shaft, adapted to be rotated by driving means, disposed at a rear portion of said body and in a direction perpendicular to a direction of movement of said body;
   a wheel supported for rotation on said drive shaft; and
   changing over means for changing over said wheel between a perpendicular position and an oblique position relative to said drive shaft, said changing over means including an elongated hole formed in a central portion of said wheel and a guide member in the form of a wedge which is moved along said drive shaft into and out of said elongated hole in response to the operation of an operating lever;
   such that, during running on land of said amphibian vehicle, said wheel may be directed perpendicularly to said drive shaft, and during running on the water, said wheel may be directed obliquely to said drive shaft.

2. An amphibian vehicle according to claim 1, wherein said wheel includes a disk having a thickness which gradually increases toward the center of said wheel.

3. An amphibian vehicle according to claim 2, wherein an odd plural number of propelling blades which gradually project from the center to a circumferential edge of said wheel are located in an equiangularly spaced relationship from each other on each of opposite side faces of said wheel with said propelling blades on one of said side faces being displaced by an angle of 180 degrees from those on the other of said side faces.

4. An amphibian vehicle according to claim 2, wherein one of a pair of disk elements made of a synthetic resin material is fitted at a circumferential edge thereof with one of recessed grooves formed along inner circumferential edges on opposite side faces of a tire and an elastic member having a synthetic resin binder adhered to an outer face thereof is contacted with an inner face of said one disk element while the other disk element is fitted at a circumferential edge thereof with the recessed groove on the opposite side of said tire, whereby, by hardening of said synthetic resin binder, the outer face of said elastic member thus hardened is securely fixed to the inner faces of said disk elements.

5. An amphibian vehicle according to claim 1, wherein said float members include a float member at the front portion of said body and a pair of float members on opposite sides of said body.

6. An amphibian vehicle according to claim 5, wherein said float member at the front portion of said body is in the form of a flat plate having formed on a bottom face thereof an abutting face which abuts against the surface of the water when said body advances from land onto the water.

7. An amphibian vehicle according to claim 5, wherein inner faces at rear portions of said float members on both sides of said body are formed into tapered faces which gradually expand outwardly toward the rear ends of said float members.

8. An amphibian vehicle according to claim 6, wherein bearings for opposite ends of said drive shaft each include a bracket having a substantially angular C-shaped cross section which is securely mounted at an upper end thereof on a bottom face of each of said float members on both sides of said body, an end of said drive shaft being inserted into said bracket from below, and a holding means removably mounted on a bottom end portion of said bracket for preventing the end of said drive shaft from being removed from said bracket.

9. An amphibian vehicle according to claim 1, wherein said front wheel is in the form of a disk which acts as a rudder during running of said amphibian vehicle on the water.

* * * * *